(12) United States Patent
Zanella

(10) Patent No.: US 10,322,512 B2
(45) Date of Patent: Jun. 18, 2019

(54) JOINT FOR CONSTRUCTIONS

(71) Applicant: C.R.F. Societa Consortile per Azioni, Orbassano (Turin) (IT)

(72) Inventor: Alessandro Zanella, Turin (IT)

(73) Assignee: C.R.F. Società Consortile per Azioni, Orbassano (Turin) (IT)

( * ) Notice: Subject to any disclaimer, the term of this patent is extended or adjusted under 35 U.S.C. 154(b) by 454 days.

(21) Appl. No.: 15/182,223

(22) Filed: Jun. 14, 2016

(65) Prior Publication Data

US 2016/0361825 A1    Dec. 15, 2016

(30) Foreign Application Priority Data

Jun. 15, 2015  (EP) ..................... 15172181

(51) Int. Cl.
| | | |
|---|---|---|
| *B25J 15/00* | (2006.01) | |
| *F16B 3/00* | (2006.01) | |
| *F16B 7/04* | (2006.01) | |
| *B33Y 80/00* | (2015.01) | |

(52) U.S. Cl.
CPC ........... *B25J 15/0061* (2013.01); *B33Y 80/00* (2014.12); *F16B 3/00* (2013.01); *F16B 7/0426* (2013.01); *Y10S 901/15* (2013.01); *Y10S 901/28* (2013.01); *Y10S 901/29* (2013.01); *Y10S 901/31* (2013.01)

(58) Field of Classification Search
CPC .......... B33Y 80/00; F16B 3/00; F16B 7/0426; B25J 15/0061
See application file for complete search history.

(56) References Cited

U.S. PATENT DOCUMENTS

| | | | |
|---|---|---|---|
| 579,643 A | | 3/1897 | Gleason |
| 2,050,137 A | * | 8/1936 | Walsh ................. F16L 19/0218 |
| | | | 277/612 |
| 3,383,883 A | * | 5/1968 | Dutaret ..................... F16D 3/50 |
| | | | 267/182 |
| 4,218,080 A | * | 8/1980 | Kendrick ................ F16L 23/04 |
| | | | 277/611 |
| 4,357,137 A | * | 11/1982 | Brown ...................... F16D 1/06 |
| | | | 464/150 |

(Continued)

FOREIGN PATENT DOCUMENTS

WO    2012/109351 A1    8/2012

OTHER PUBLICATIONS

European Search Report for corresponding EP Application No. 15172181.8 dated Nov. 25, 2015, completed on Nov. 17, 2015.

*Primary Examiner* — Daniel J Wiley
(74) *Attorney, Agent, or Firm* — Heslin Rothenberg Farley & Mesiti P.C.; Victor A. Cardona, Esq.

(57) ABSTRACT

A joint for constructions includes a first element having a first coupling interface, a second element having a second coupling interface, and an interface element configured for coupling to the first coupling interface and the second coupling interface to impose a desired relative angular position on the first element and the second element of the joint. The interface element includes a first positioning structure configured for engaging with the first coupling interface, and includes a second positioning structure configured for engaging with the second coupling interface. The first positioning structure and the second positioning structure of the interface element are angularly staggered with respect to one another.

11 Claims, 8 Drawing Sheets

(56) References Cited

U.S. PATENT DOCUMENTS

| | | | |
|---|---|---|---|
| 4,464,141 A * | 8/1984 | Brown | F16D 3/185 |
| | | | 464/150 |
| 4,530,262 A | 7/1985 | Pownall | |
| 5,660,591 A * | 8/1997 | Reynolds | F16D 3/74 |
| | | | 277/912 |
| 6,623,047 B2 * | 9/2003 | Olechnowicz | F16L 19/005 |
| | | | 277/611 |
| 7,609,020 B2 | 10/2009 | Kniss et al. | |
| 2013/0189028 A1 | 7/2013 | Gershenfeld et al. | |
| 2014/0270909 A1 | 9/2014 | Oerder | |
| 2015/0158244 A1 * | 6/2015 | Tibbits | C08F 220/20 |
| | | | 428/516 |
| 2015/0300861 A1 * | 10/2015 | Regen | G01F 1/58 |
| | | | 73/37 |
| 2016/0361825 A1 * | 12/2016 | Zanella | B25J 15/0061 |

* cited by examiner

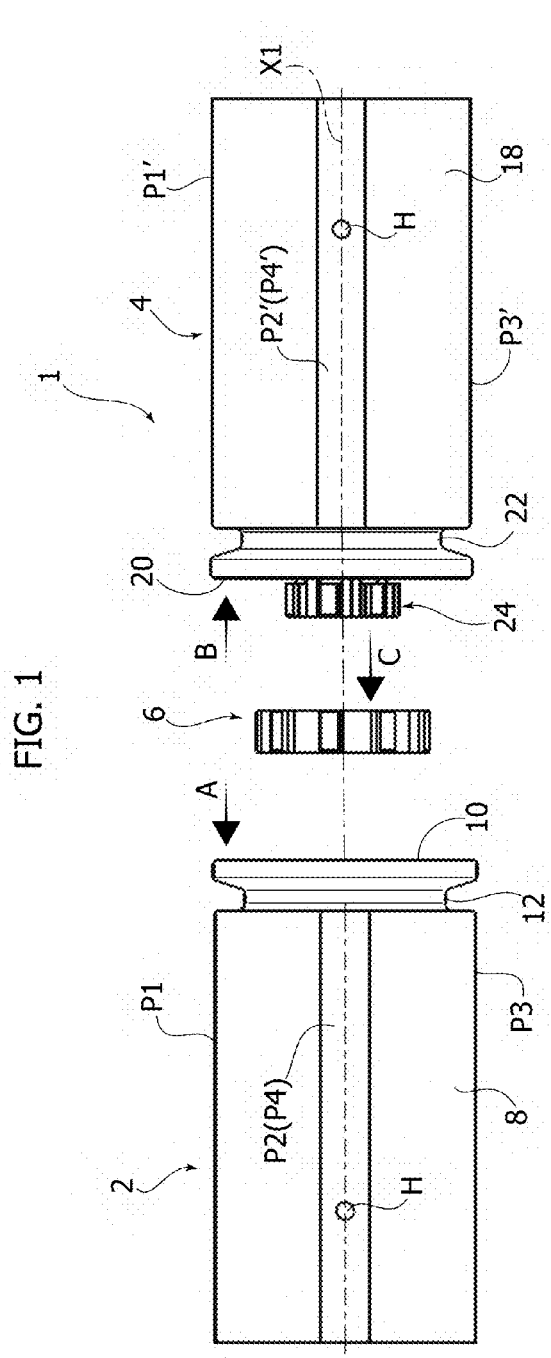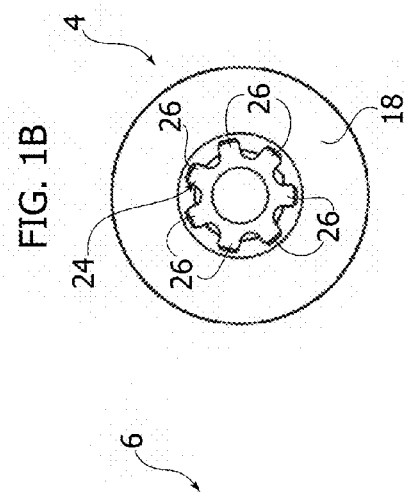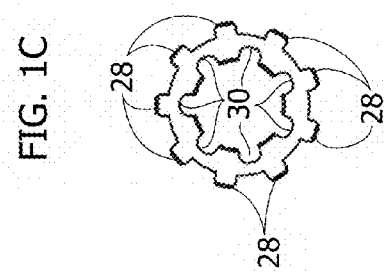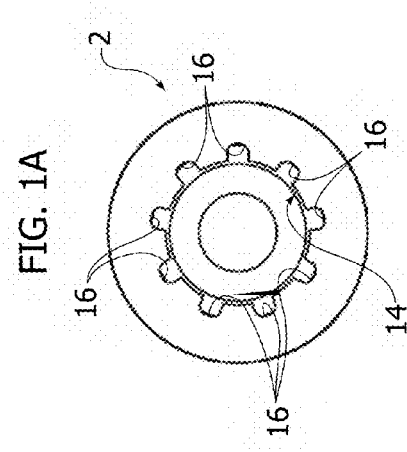

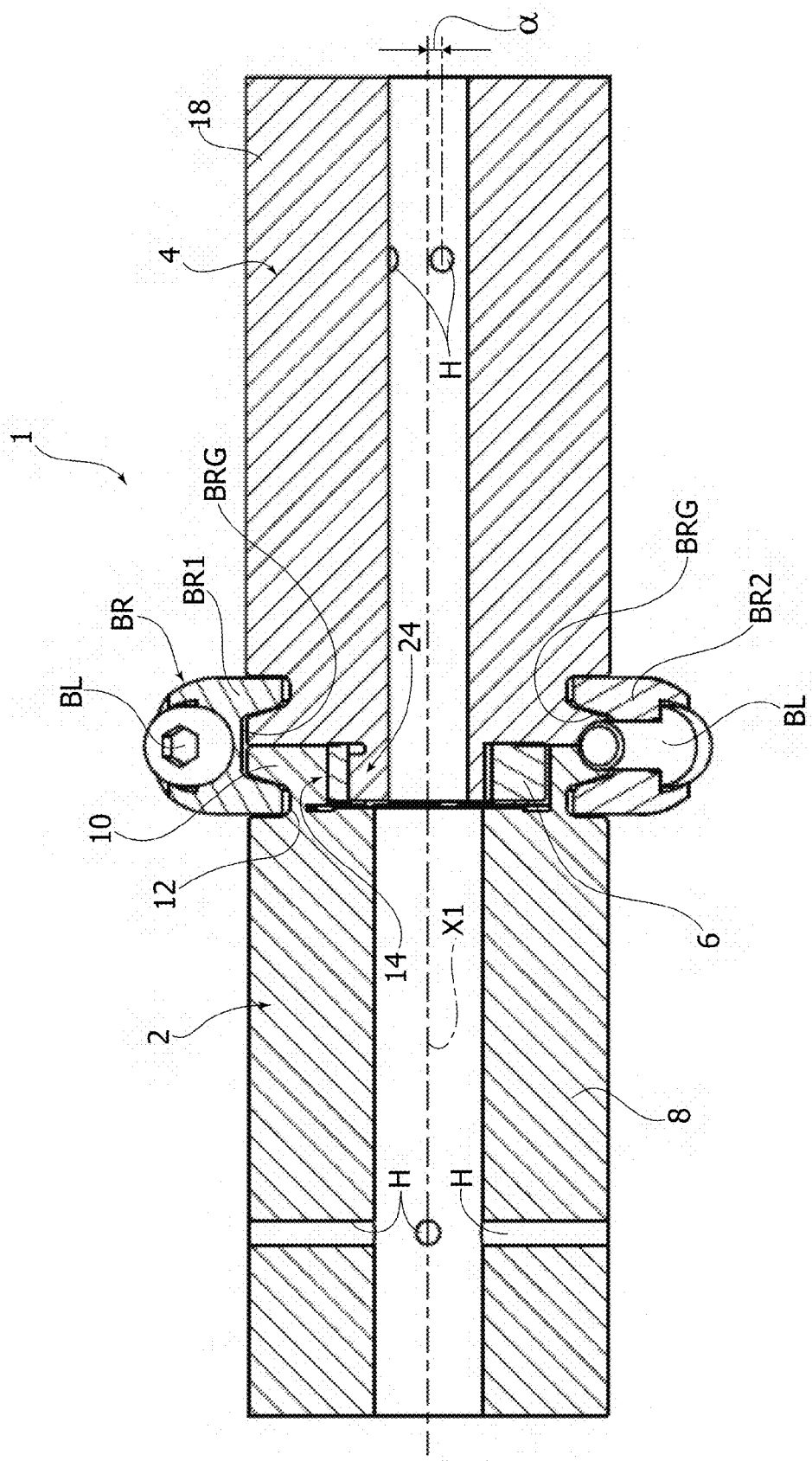

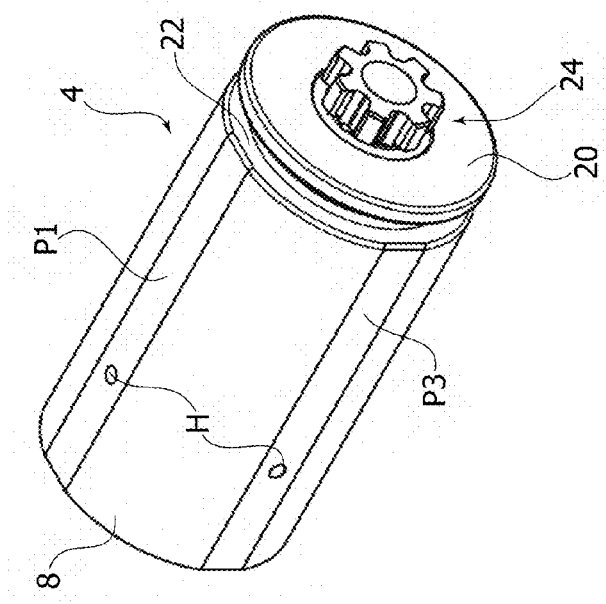
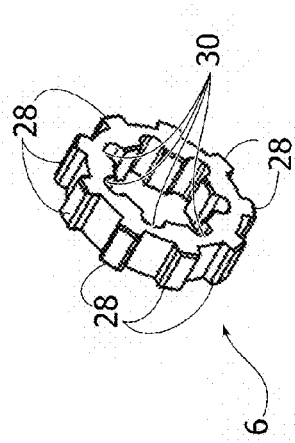
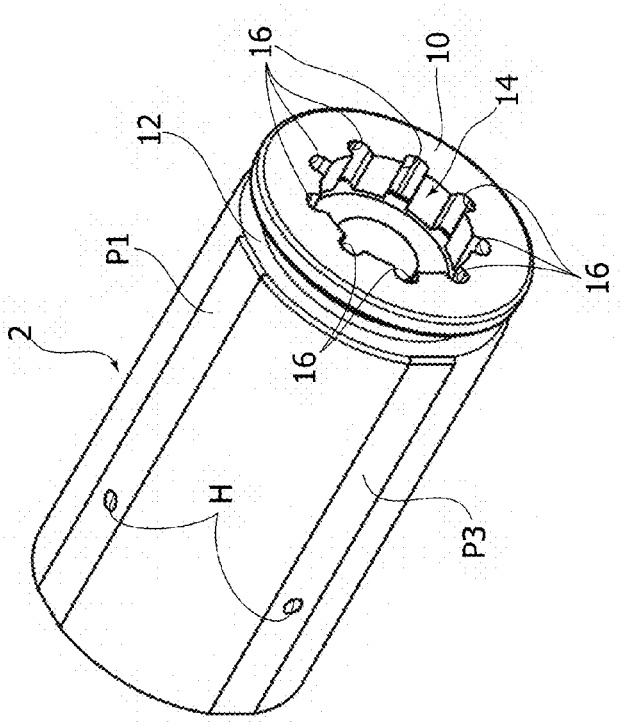

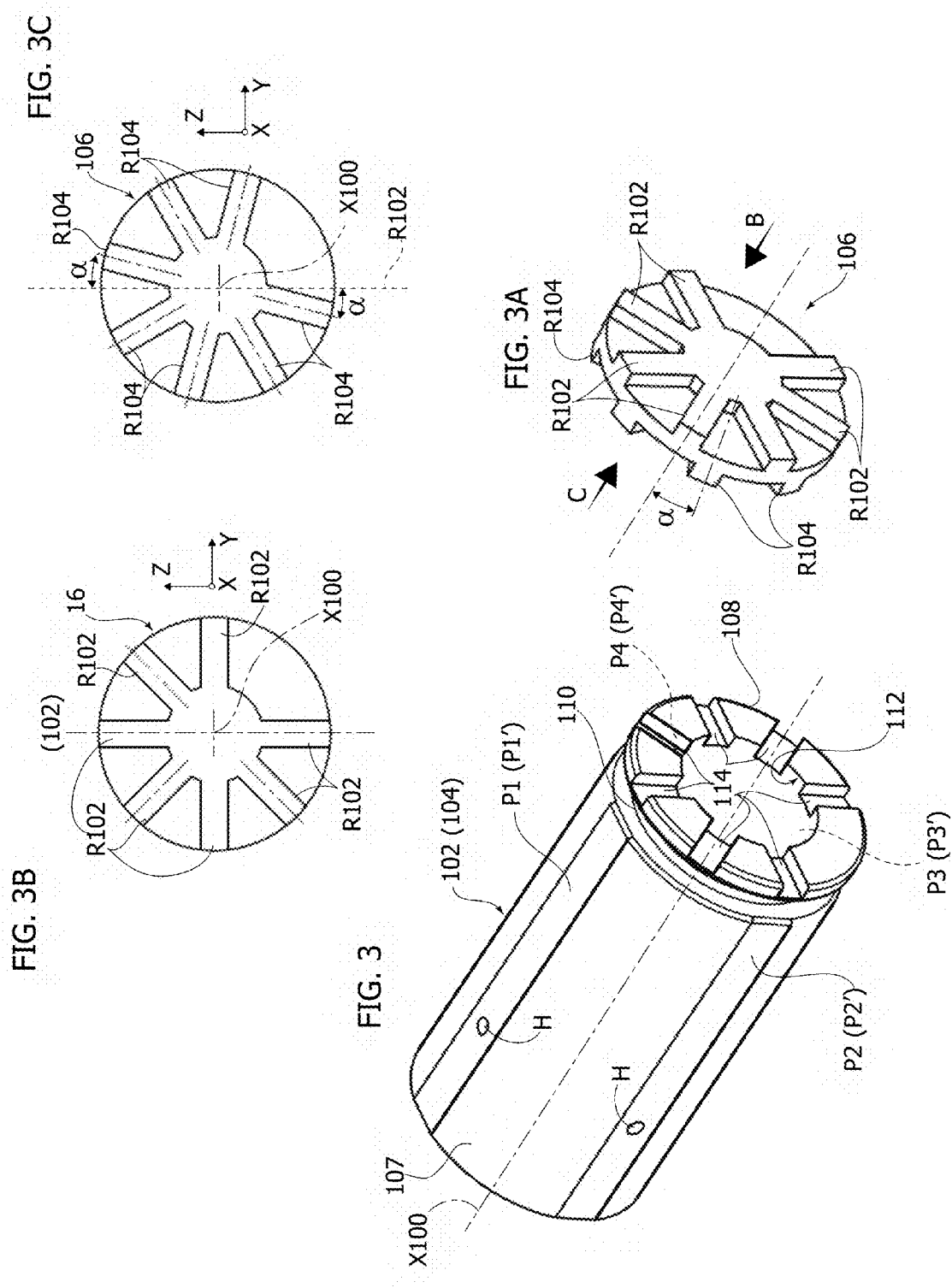

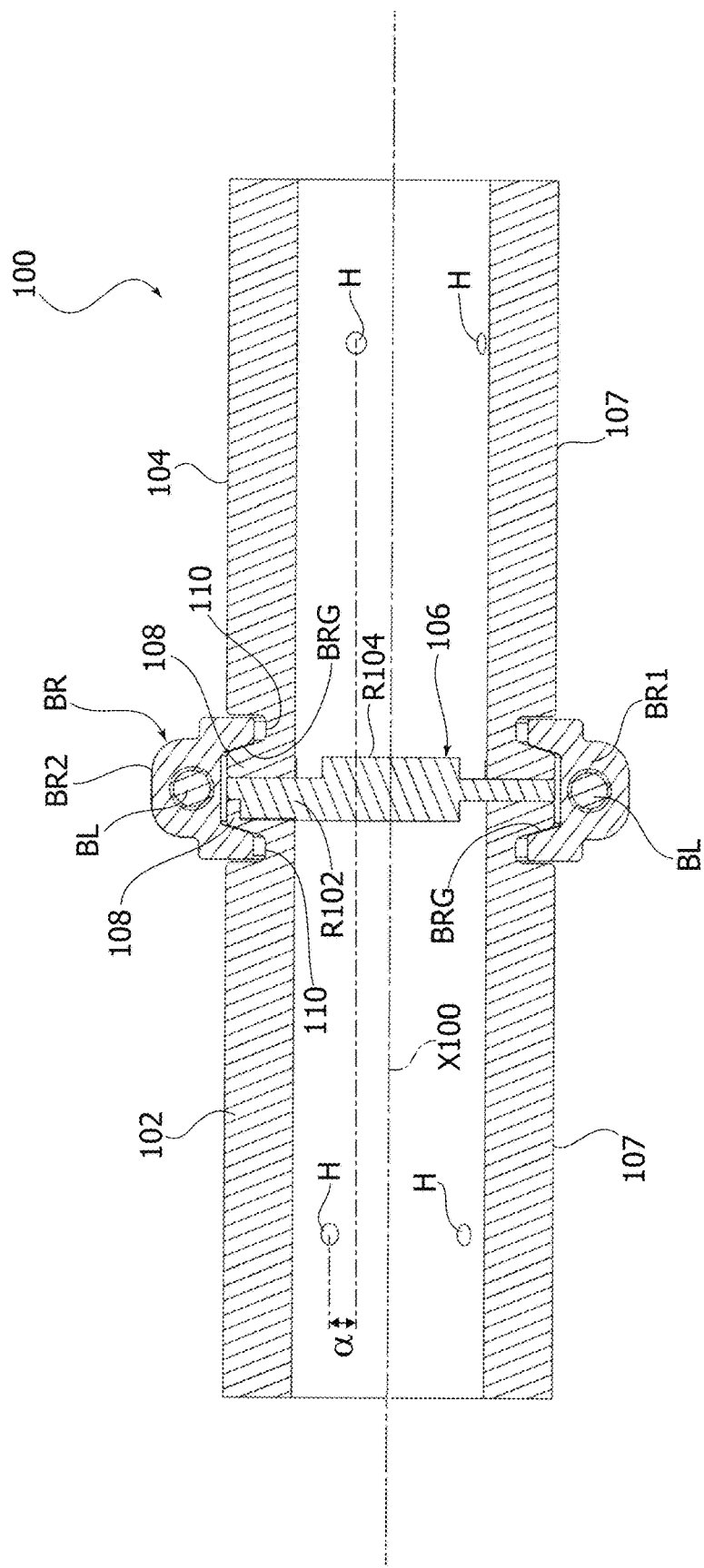

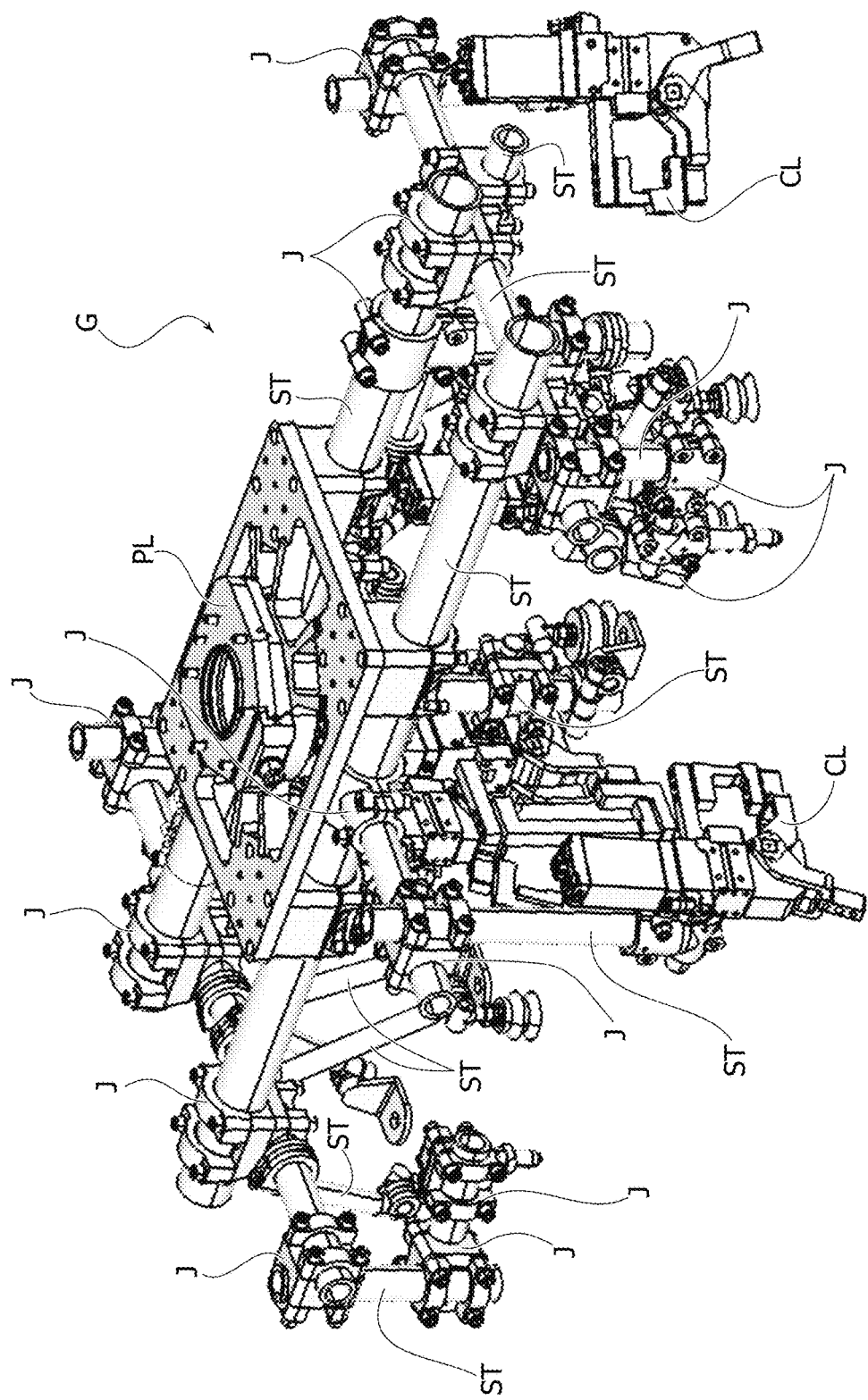

JOINT FOR CONSTRUCTIONS

CROSS REFERENCE TO RELATED APPLICATIONS

This application claims priority from European Patent Application No. 15172181.8 filed on Jun. 15, 2015, the entire disclosure of which is incorporated herein by reference.

FIELD OF THE INVENTION

The present invention relates to joints for constructions of the type comprising:
a first element having a first coupling interface;
a second element having a second coupling interface; and
an interface element configured for coupling to said first coupling interface and said second coupling interface in order to impose a desired relative angular position on said first element and said second element of the joint.

The invention has been developed with particular reference to joints for connecting modular elements for assembling frames, for example (but not exclusively) frames for supporting clamps configured for engaging bodywork parts, where the frames carrying the clamps (i.e., the so-called "grippers") can be connected to the wrist of a robot.

PRIOR ART AND GENERAL TECHNICAL PROBLEM

Construction of supporting frames by means of modular construction elements (for example, cylindrical tubes) connected together by means of joints constitutes an ever more widely adopted solution thanks to the considerable flexibility that characterizes it.

An example of a known structure that can be obtained by means of modular elements is represented in FIG. 4 and is designated by the reference G. The structure G is in particular a gripper for bodywork parts of a motor vehicle, i.e., a frame of tubular elements obtained by joining a plurality of cylindrical tubular elements ST connected via a plurality of joints J, each characterized by at least two bushings that receive corresponding ends (or portions in general) of tubular elements ST. Moreover provided at the ends of some structural elements ST are clamps CL for gripping predetermined portions of bodywork parts of motor vehicle (in this example, an engine bonnet), and the entire structure is carried by a main plate PL, which is configured for the interface with the wrist of a robot.

As may be noted, construction of the above structures, albeit inexpensive, is decidedly laborious in so far as it is necessary to position manually all the structural elements ST, which means manually setting the position of the elements ST also in cases where these are oriented with respect to one another in a way that is not easily reproducible, for example in a non-orthogonal way in order to adapt to the geometry of the item to be handled. This entails the need to tolerate positioning errors of a non-negligible amount and to have to check periodically alignment of the structures.

Some variants, not illustrated herein in detail in so far as they are known, envisage the use of joints including a first element and a second element, each of which is provided with a coupling interface in the form of a front collar. The first and second elements—which may be simple elements for receiving the tubular elements that constitute the structure or may themselves constitute the tubular elements that make up the structure—are clamped to one another (thus clamping the joint) by a clamp fastener. This clamp fastener may comprise, for example, a first split ring clamp and a second split ring clamp configured for being fitted on the collars of the elements of the joint and moreover configured for being joined to one another, thus clamping the two collars together.

Each of the elements of the joint moreover includes four assembly planes consisting of four axial flattened portions provided at 3 o'clock, 6 o'clock, 9 o'clock, and 12 o'clock.

These assembly planes enable coupling to further structural elements having identical assembly surfaces or a different geometry (with at least one flat face) configured for coupling to a corresponding one of said assembly planes. Assembly of structural elements the orientation of which with respect to the immediately adjacent elements is not easily reproducible (for example non-orthogonal elements) is obtained by introducing an angular staggering between the assembly surfaces of the elements of the joint at the moment of installation of the joint itself.

In particular, one of the two collars, the one on the element of the joint that is to be coupled to a further structural element with orientation that is not compatible with the arrangement of the assembly surfaces, is rotated about the axis of the joint until the assembly surfaces are brought into a desired position.

Also in this case, however, rotation of the element of the joint is carried out manually, once more raising the problem of imprecision of assembly and of the necessity for periodic checks on the geometry of the structure.

Various attempts have been made to overcome the problems mentioned previously, as will be illustrated briefly hereinafter.

A first attempt at providing a solution to the above problem is known, for example, from the document US 2014/0270909 A1, which uses a joint for structural elements including a first element and a second element, each having a coupling interface consisting of a flanged collar made on which is an internal toothing.

The joint moreover includes an interface element shaped like a toothed ring with external toothing, the teeth of which are configured for engaging the grooves of each of the two coupling interfaces. The elements of the joint can be angularly staggered in a discrete way in so far as the minimum pitch of variation is equal to the pitch between two successive grooves in the interface collars, which in the example illustrated is 15°.

The above solution, however, presents the drawback of not making possible any adjustment of the angular position the amplitude of which is not an integer multiple of the pitch of the grooves on the interface collars.

It should moreover be noted that the above solution has a perfectly evident technological limit: owing to the way in which the joint is made, it is not in any case possible to make an adjustment below a certain minimum value of amplitude (which would make it possible to provide a large number of amplitudes of angular staggering) in so far as this would require provision of an internal toothing on the interface collars with a large number of teeth, at the expense of the structural strength of the joint and of the economic advantage thereof (in so far as the process cost would increase considerably).

A second proposed solution may be found in the document U.S. Pat. No. 7,609,020 B2, which illustrates a joint that includes a first element and a second element, each of which is provided with a coupling interface consisting of a flanged collar provided on which are four grooves arranged in the form of a cross configured for coupling with a cross key.

In this case, unlike the solution previously mentioned, the problem of the impossibility of setting any angular staggering does not arise in so far as it is possible to machine the interfaces on each of the two elements so as to obtain any desired angular staggering.

However, the fact that each of the two elements of the joint must couple to one and the same cross key imposes in effect alignment of the grooves of each of the two flanged collars at the moment of installation of the joint.

This means that the relative angular position admissible for each of the two elements of the joint is in effect just one (but for the three alternative positions due to the periodicity of the coupling with the cross key), and is decided at the moment of formation of the grooves in the collars.

The above solution is even less flexible than the previous one in so far as a specialized machining of the elements of each joint of the structure is required to meet the geometrical needs of the structure itself, with the evident disadvantage inherent in the low compatibility of the joints with structures different from the one for which they are devised.

OBJECT OF THE INVENTION

The object of the invention is to solve the technical problems mentioned previously. In particular, the object of the invention is to provide a joint for constructions in which it is possible to vary in a desired way the relative angular position between the two elements that constitute the joint, without this requiring a specific and specialized machining of the elements themselves.

SUMMARY OF THE INVENTION

The object of the present invention is achieved by a joint for constructions and by an interface element for a joint for constructions, having the features forming the subject of the ensuing claims, which form an integral part of the technical disclosure provided herein in relation to the invention.

In particular, the object of the invention is achieved by a joint for constructions having the features listed at the beginning of the present description and moreover characterized in that:

said interface element includes a first positioning structure configured for engaging with said first coupling interface; and said interface element includes a second positioning structure configured for engaging with said second coupling interface, wherein said first positioning structure and said second positioning structure of said interface element are angularly staggered with respect to one another.

BRIEF DESCRIPTION OF THE DRAWINGS

The invention will now be described with reference to the annexed drawings, which are provided purely by way of non-limiting example and in which:

FIG. 1 is an exploded side view, with some components removed for clarity, of a joint according to a first embodiment of the invention;

FIGS. 1A, 1B and 1C are front views according to the arrows A, B, C of FIG. 1, respectively;

FIG. 1D is a cross-sectional view of the joint of FIG. 1 in the assembled condition;

FIGS. 2A, 2B, and 2C are perspective views of the components of FIGS. 1A, 1B, and 1C, respectively;

FIG. 3 is a perspective view of a modular element of a joint according to a second embodiment of the invention;

FIG. 3A is a perspective view of an interface element configured for use of the joint according to the second embodiment of the invention;

FIGS. 3B and 3C are front views according to the arrows B and C, respectively, of FIG. 3A;

FIG. 3E is a view in longitudinal section similar to that of FIG. 1D but referring to the second embodiment of the invention; and FIG. 4, which has already been described, is a perspective view provided by way of example of a structure that can be obtained using joints according to the invention.

DETAILED DESCRIPTION

Figure 2D:
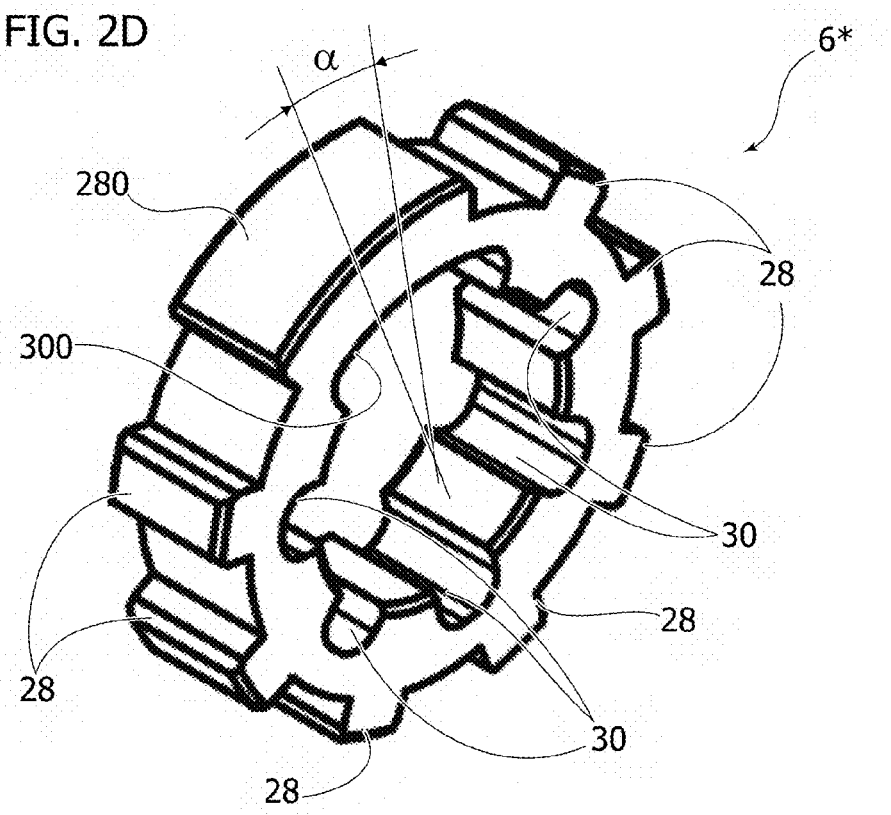
FIGS. 2D and 2E are a front view and a perspective view, respectively, of a variant of the component of FIG. 2C.

With reference to FIG. 1, number 1 designates as a whole a joint according to a first preferred embodiment of the invention.

In the ensuing description, the term "joint" is intended to designate in general a connection between two (or possibly more) components, referred to as "first joint element" and "second joint element" (or "third joint element", "fourth joint element", and so forth, if so required). Each element of the joint may be indifferently a simple receptacle for a modular element that makes up a structure (such as, for example, a cylindrical tubular element), or may itself constitute the aforesaid modular element. Consequently, whenever the ensuing description refers to a joint, at least these two possibilities are to be understood as being contemplated.

The joint 1 develops longitudinally along a main axis X1 and includes a first element 2, a second element 4 (both preferentially made of metal material), and an interface element 6. The first element 2 comprises a cylindrical tubular body 8 that functions as receptacle for a modular structural element such as, for example, a cylindrical tube. Provided on the outer surface of the body 8 are four assembly planes P1, P2, P3, P4 arranged at 12 o'clock, 9 o'clock, 6 o'clock, and 3 o'clock, respectively (P4 is not visible in the figure but is in a position diametrally opposite to the surface P2 and is consequently indicated in brackets together with the surface P2).

Provided at one end of the cylindrical body 8—which hence coincides with one end of the element 2—is a collar 10, made on the outer surface of which is an annular groove 12, which is configured for coupling to a clamp fastener (represented in FIG. 1D and designated by the reference BR) per se known, and for example obtained by means of a pair of split ring clamps BR1, BR2 joined by threaded connections BL. The clamp fastener BR moreover includes an annular groove BRG (in two pieces, one for each split ring clamp BR1, BR2), which is configured for providing a shape fit with the elements 2, 4, which clamps the joint 1.

Provided in the collar 10 is a first coupling interface of the first element 2. This coupling interface is designated by the reference number 14 and includes a substantially cylindrical recess, provided on the lateral surface of which is a plurality of radial grooves 16, here by way of example nine in number. In this way, the global shape of the interface 14 can at least roughly be likened to that of an internal toothing of a gear.

The second element 4 is substantially similar to the first element 2, except for the corresponding coupling interface.

The second element 4 comprises a cylindrical body 18 including four assembly planes P1', P2', P3', P4' arranged at 12 o'clock, 9 o'clock, 6 o'clock, and 3 o'clock in a way similar to the planes P1, P2, P3, P4. Preferentially, provided in each assembly surface is a radial hole H for coupling of further components.

Provided at one end of the body 18, which coincides with one end of the element 4, is a collar 20, made on the outer surface of which is an annular groove 22. The collar 20 and the annular groove 22 have a geometry identical to that of the collar 10 and the groove 12. They are in fact configured for coupling to the clamp fastener BR, which at the moment of installation of the joint 1 fits on the collars 10, 20 by means of the groove BRG, and engages within the grooves 12, 22, thus clamping the collars 10, 20 together.

Moreover provided on the front surface of the collar 20 is a second coupling interface of the second element 4. This coupling interface is designated by the reference number 24 and, unlike the interface 14, is in relief with respect to the collar; i.e., it projects axially therefrom.

In greater detail, the interface 24 includes a sprocket-wheel element having an external radial toothing, and in particular including a plurality of radial teeth 26, here, by way of example, seven in number.

The geometry of the first and second coupling interfaces 14, 24 renders impracticable a stable coupling in a direct way: in other words, they are unable to couple with one another in an effective way in order to impose a relative angular position on the elements 2, 4. The inner diameter of the interface 14 is in fact greater than the outer diameter of the teeth 26 so that no shape fit is possible (without considering that in the example in question the number of teeth and grooves is different).

Instead, the interfaces 14 and 24 can be coupled indirectly through the interface element 6. The latter is shaped like an annular element including a plurality of radial teeth 28 on an outer circumferential surface, where the teeth 28 are configured for coupling within the grooves 16. Provided, instead, on an inner circumferential surface is a plurality of grooves 30 configured for receiving a corresponding radial tooth 26. In other words, at the moment of installation of the joint (FIG. 1D), the first interface 14 couples with the teeth 28 of the interface element 6, whilst the second interface 24 couples within the grooves 30 of the interface element 6. It will be appreciated on the other hand from FIG. 1D that, at the moment of assembly of the joint 1, all the elements thereof (elements 2, 4, and interface element 6, as well as the clamp fastener BR) arrange so as to be coaxial to the axis X1.

With reference to FIG. 1C, it should be noted that actually the radial teeth 28 and the grooves 30 define, respectively, a first positioning structure and a second positioning structure of the interface element 6, which is in this way able to impose a desired relative angular position on the first element 2 and the second element 4.

To do this, the first and second positioning structures of the interface element 6 are angularly staggered with respect to one another. This means that there exists an angular staggering between a tooth 28 assumed as position reference for the interface 14 (and hence for the element 2) and a groove 30 assumed as position reference for the interface 24 (and hence for the element 4). This angular staggering (measured about the axis X1) is designated by the reference a in FIG. 1C and in this illustrative example is 0°. Preferentially, the tooth 28 and the groove 30 assumed as reference are chosen as corresponding to a groove 16 and a tooth 26 that are aligned in a radial direction orthogonal to one of the assembly surfaces P1, P2, P3, P4 and P1', P2', P3', P4'.

An example of angular staggering a different from 0° is visible in FIG. 1D, in particular with the circumferential dimension a that extends between the centres (projected longitudinally) of two holes H on homologous assembly planes of the two elements 2, 4.

It should be noted that in this way the variability of the desired relative angular position of the two elements 2, 4 of the joint 1 is transferred from the coupling interfaces 14, 24 of the elements 2, 4 themselves (as occurs in the known art) to the interface element 6. In this way, the coupling interfaces 14, 24 can always be obtained in an identical way, thus transferring the need for a specific machining operation to just the element 6.

The latter, as may be appreciated, is intrinsically an item that is readily reproducible, and can for example be reproduced in a simple, fast, and economically advantageous way using a 3D printer starting from a three-dimensional mathematical model generated by means of a computer-aided design (CAD) application.

In addition, in this way it is also possible to set up a kit of interface elements 6 in the form of an electronic library (a sort of "virtual warehouse"), i.e., one in which the aforesaid kit is provided on a computer-readable mass-memory device (for example, a hard disk, a compact disk, a DVD, a removable disk, etc.). Each interface element is stored as a three-dimensional mathematical model generated by means of an electronic CAD application and is associated to a given angular staggering a between the structures for positioning the interface element itself that corresponds to a given desired relative angular position of the elements 2, 4.

Each of the mathematical models stored in the virtual warehouse can be recalled when so required and sent to the 3D printer for its realization, according to the demand. Of course, it is also possible to envisage generation of the three-dimensional mathematical model of the interface element when so required, i.e., generation thereof at the required moment by means of a computer application (for example, a 3D CAD application) and using as input datum just the value of the desired angular staggering.

In this way, the elements 2 and 4 can be used universally with respect to the structure to be obtained. Once the geometry of the structure is known, it will only be necessary to create the interface elements 6 that determine this geometry.

Nevertheless, in the case where it is not conveniently possible to have available a 3D printer, it is possible to set up a kit of interface elements—made of metal material employing traditional processes, or previously produced by means of 3D printing—that provide the predefined values of angular staggering of statistically most frequent use.

Figure 2E:
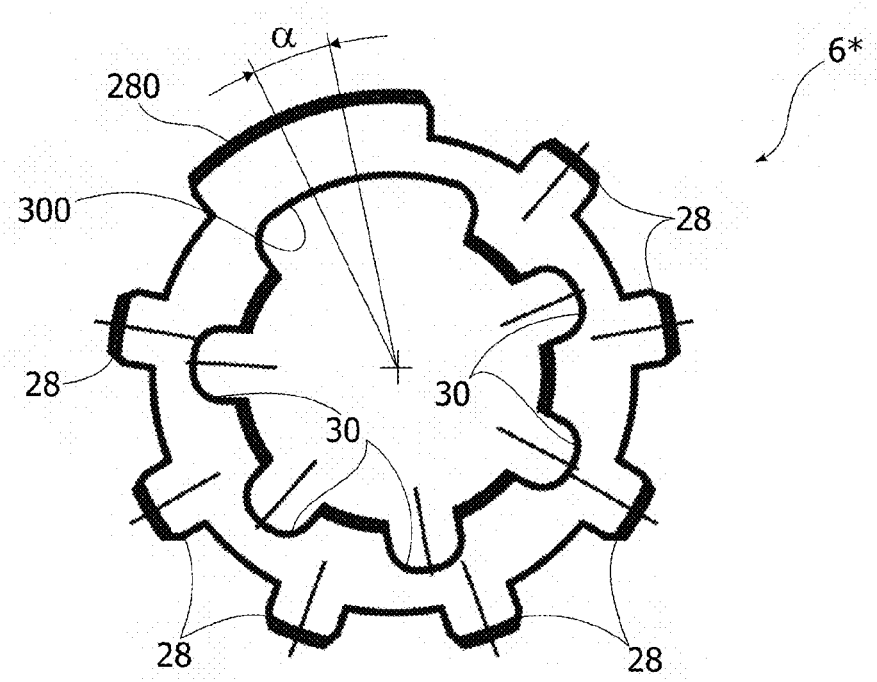

A variant of the interface element 6 is illustrated in FIGS. 2D and 2E and is designated by the reference number 6*. The interface element 6*, to which the foregoing description applies also as regards creation of a virtual kit of interface elements, differs from the element 6 only in that a union of two or more successive grooves 30 and teeth 28 is envisaged to define an angular position reference. In the example illustrated, two adjacent grooves 30 have been joined together (to cover an angular extension wider than the sum of the angular extensions of two individual grooves 30) to form an extended groove 300, while two adjacent teeth 28 have been joined together (to cover an angular extension wider than the sum of the angular extensions of two individual teeth 28) to form an extended tooth 28. Of course, the coupling interfaces 12, 24 on the elements 2, 4 will have to be modified accordingly, with the union of two adjacent grooves 16 and two adjacent teeth 26, respectively. It is to be noted that also in this embodiment, like the embodiment of the element 6 illustrated previously, the two positioning structures on the element 6* preferably have a different geometry.

The angle α is visible in FIGS. 2D and 2E and can be identified, for example, via the staggering between the centre lines of the extended tooth 280 and of the extended groove 300 that function as position references.

With reference to FIG. 3, a second embodiment of a joint according to the invention is designated by the reference number 100. The joint 100 develops in a longitudinal direction along a main axis X100 and includes a first element 102 and a second element 104 and an interface element 106 configured for coupling to the first and second elements 102, 104 for imposing a desired angular staggering thereon.

The elements 102, 104 are altogether identical to one another, this being the reason why just the element 102 is here described. The possible corresponding references of the element 104 are alternatively indicated in brackets or else are identical to those of the element 102. The description provided herein in relation to the element 102 thus applies identically to the element 104.

The element 102 includes a tubular cylindrical body 107 that functions as receptacle for a modular structural element, such as for example a cylindrical tube. Provided on the outer surface of the body 107 are four assembly planes P1, P2, P3, P4 set at 12 o'clock, 9 o'clock, 6 o'clock, and 3 o'clock, respectively (surfaces P1', P2', P3', P4' for the element 104).

At one axial end of the body 107, coinciding with one end of the element 102, a collar 108 is provided on the outer surface of which a circumferential groove 110 is made, which is configured for engagement with the clamp fastener BR in a way altogether similar to what has already been described for the joint 1.

Provided on an annular front surface of the collar 108 is a first coupling interface of the first element 102. The coupling interface 112 includes a plurality of radial grooves, which for simplicity can be described as belonging to two series, namely:
a first series of four grooves arranged in the form of a cross, i.e., spaced at angles of 90° apart; and
a second series of three grooves arranged along directions orthogonal to one another (90°) as in the form of a cross, but in which a fourth groove that would correspond to the fourth arm of the cross is absent.

The two series are arranged at 45° apart (equivalently, it may be said that all the grooves are equally spaced apart by 45°, except where the second series lacks the fourth groove, where the spacing is 90°). In other words, each groove is in a position of bisectrix with respect to two adjacent grooves, except where the second series lacks the fourth groove.

One of the two grooves at 90° (hence, of the first series) with respect to one another can thus define a position reference. For this purpose, it is preferentially positioned in a radial direction orthogonal to an assembly surface (two surfaces if circular symmetry is considered).

In this way, as will be appreciated, the other three orthogonal grooves of the first series are also aligned in radial directions orthogonal to the remaining assembly surfaces and identify the position of the latter.

The shape of the interface 112 may of course be modified and varied according to the needs, but it should be noted that it is the same for each of the elements 102, 104 that constitutes the joint 100.

The element 106 is accordingly substantially disk shaped and includes a first positioning structure and a second positioning structure located on opposite faces thereof and consisting, respectively, of a first plurality of reliefs R102 configured for coupling in the grooves 114 of the element 102, and a second plurality of reliefs R104 configured for coupling in the grooves 114 of the element 104.

Figure 3D:
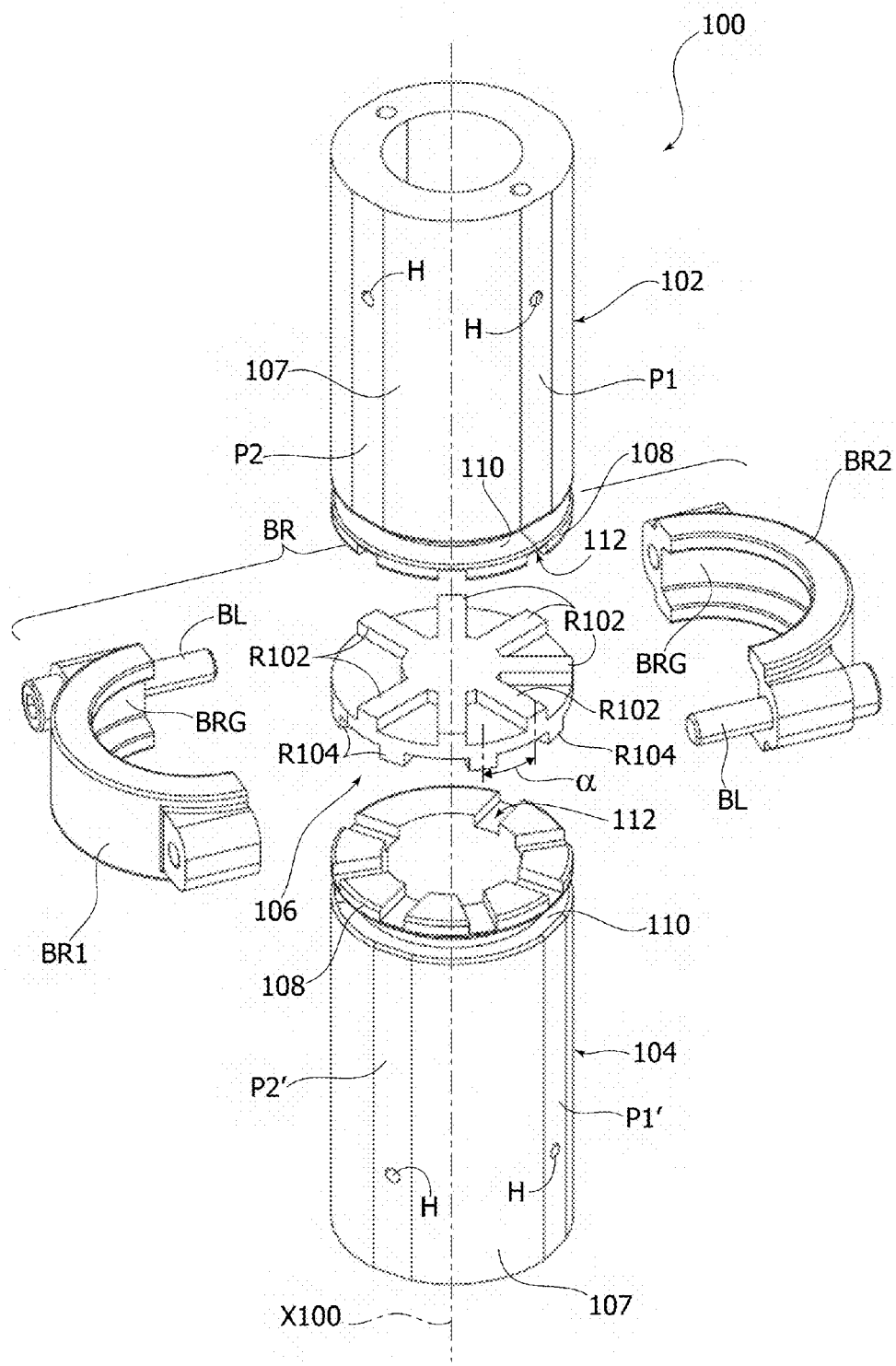
FIG. 3D is an overall exploded view of the joint according to the second embodiment of the invention.

As may be noted from FIGS. 3B and 3C, the plurality of reliefs R102, R104 define the same silhouette (corresponding to the silhouette of the grooves 114), except that they are anglularly staggered by the angle α. The angle α may be seen, for example, in FIG. 3C, where the dotted line indicates a median line of a relief R102 on the opposite face of the element 106. In this connection, it should be noted that, as a demonstration of the fact that the representations of FIGS. 3B and 3C are obtained in the same reference system, the cartesian reference systems X-Y-Z are presented in both figures. The angle α may also be noted in FIGS. 3D and 3E (the latter with a representation similar to that of FIG. 1D).

Consequently, like the interface element 6, the first and second positioning structures on the interface element 106 are angularly spaced apart by an angle that enables assignment to the elements 102, 104 of a desired relative angular position.

With reference to FIGS. 3D and 3E, at the moment of installation of the joint 100, the coupling interfaces 112 of each of the two elements 102, 104 are engaged with the positioning structures R102, R104 of the interface element 106, which thus sets itself in a position comprised between the two elements 102, 104. It should moreover be noted that all the elements of the joint (elements 102, 104, 106 and clamp fastener BR) arrange so to be coaxial to the axis X100.

The angular staggering a between the positioning structures R102, R104 (measured about the axis X100) imposes a corresponding (desired) angular staggering between the elements 102, 104, in particular between the planes P1, P2, P3, P4 and the planes P1', P2', P3', P4'. Also in this case, as will be appreciated, the variability in the relative angular positioning between the elements 102, 104 is entirely entrusted to the interface element 106, which, like the same element 6, can be produced in a fast and economically advantageous way, for example, using a 3D printer.

This means that also in this case it is possible to set up a kit of interface elements 106 in the form of an electronic library (virtual warehouse), i.e., one in which the aforesaid kit is provided on a computer-readable mass-memory device (for example, a hard disk, a compact disk, a DVD, a removable disk, etc.). Each interface element is stored as a three-dimensional mathematical model generated by means of an electronic CAD application and is associated to a given angular staggering a between the positioning structures of the interface element itself that corresponds to a given desired relative angular position of the elements 102, 104.

Each of the mathematical models stored in the virtual warehouse can be recalled, when so required, and sent to the 3D printer for its realization, according to the demand.

It is hence possible, in effect, to arrive at definition of a method for assembling a joint 1 or 100 comprising the following steps:
determining a desired relative angular position of the first and second elements of the joint;
producing the interface element 6, 106 using a 3D printer, wherein the first and second positioning structures of the interface element are angularly staggered by an angle α resulting—with the joint assembled—in the desired relative angular position;

coupling the first and second positioning structures to the first and second coupling interfaces, respectively; and fastening the first and second elements of the joint, for example by means of the clamp fastener BR.

The elements 102 and 104 can then be used in a universal way with respect to the structure to be obtained. Once the geometry of the structure is known, it will only be necessary to produce the interface elements 106 that determine this geometry. In this sense, it should be noted that the joint 100 is even more advantageous than the joint 1 in so far as, in addition to sharing the technical advantage thereof consisting in the invariance of the elements of the joint, it also possesses an intrinsic advantage inherent in the identity between the two elements constituting the joint.

In other words, whereas for the joint 1 it is necessary to have a male element (element 4) and a female element (element 2), for the joint 100 both of the elements are identical to one another. This further simplifies construction of the joint, in effect reducing it to a serial production of a single element, without any need for differentiating the machining processes for the male and female elements.

The person skilled in the art will thus appreciate the advantages of the joints 1, 100 as compared to the known solutions described in the preamble of the present description. In particular, the joints 1, 100 enable any variation of the relative angular position between the elements 2, 4 and 102, 104 by simply replacing the interface element 6, 106, which can be produced according to the need in a fast and convenient way. It is hence possible to obtain any structure irrespective of its geometry.

The foregoing is obtained with the same machining operations to obtain the coupling interfaces of each element of the joint 1, and even, in the case of the joint 100, with the same machining operations to obtain the elements of the joint.

Of course, the details of construction and the embodiments may vary widely with respect to what has been described and illustrated herein, without thereby departing from the scope of protection of the present invention, as defined by the appended claims.

In particular, even though the positioning structures of the interface elements 6, 106 illustrated herein—and, by logical consequence, the coupling interfaces of the elements of the joints 1, 100—are characterized by having a plurality of positioning elements (teeth and grooves 28, 30 and reliefs R102, R104), it is possible to envisage, at the limit, interface elements that have a single positioning element that constitutes the positioning structure. In this case, the angular staggering would be even more evident in so far as corresponding to the angular staggering between the individual positioning elements of each positioning structure. In general, it is possible to have at least one positioning element in each of the positioning structures.

Nevertheless, the shapes of the positioning elements can be varied widely with respect to what has been described and illustrated: for example, on the element 6 it is possible to implement a tooth-and-groove geometry conceptually similar to that of the reliefs R102, R104. This means that it is possible to provide the interface 14 with a series of grooves that is interrupted within a certain angular range (this encompassing both the case where the interruption of the series envisages the absence of grooves in that angular range and the case where the interruption of the series envisages the presence of an extended groove throughout the angular range as in the case of the element 6*), thus establishing a first position reference. The interface 24 may, in dual fashion, be provided by means of a series of teeth that is interrupted within a certain angular range (this encompassing both the case where the interruption of the series envisages the absence of teeth in that angular range and the case where the interruption of the series envisages the presence of an extended tooth throughout the angular range in question as in the case of the element 6*), thus establishing a second position reference. In this way, it is possible to impose the angular staggering a simply by setting the relative angular position between the aforesaid two position references.

Furthermore, application of the joints 1, 100 in the construction of modular structures like the structure G for gripping and handling of bodywork parts for motor vehicles is just one possible example.

Any structure may be obtained by means of the joints 1, 100, in any sector of the industry. For instance, another preferred application consists in the construction of extended frames for handling parts of aircraft fuselages, with very evident saving in terms of money due to simplification of a structural element—namely, the joint—that is used in extremely large numbers in structures of this type.

What is claimed is:

1. A joint for constructions including:
   a first element having a first coupling interface;
   a second element having a second coupling interface; and
   an interface element configured for coupling with said first coupling interface and said second coupling interface to impose a desired relative angular position on said first element and said second element of the joint;
   said interface element comprising a first positioning structure configured for engaging with said first coupling interface;
   said interface element comprising a second positioning structure configured for engaging with said second coupling interface;
   wherein said first positioning structure and said second positioning structure of said interface element angularly staggered with respect to one another; and
   the first positioning structure and the second positioning structure including a respective series of positioning elements, each series of positioning elements including an interruption defining a positioning reference, whereby the angular staggering between the first and second positioning structures being imposed by setting the relative angular position between said positioning references.

2. The joint according to claim 1, wherein the first positioning structure and the second positioning structure of said interface element have an identical geometry.

3. The joint according to claim 2, wherein said first coupling interface and said second coupling interface have an identical geometry.

4. The joint according to claim 1, wherein the first positioning structure and the second positioning structure of said interface element have a different geometry.

5. The joint according to claim 4, wherein said first coupling interface and said second coupling interface have a different geometry.

6. The joint according to claim 1, wherein said first positioning structure and said second positioning structure are provided on opposite faces of said interface element.

7. The joint according to claim 1, wherein said first positioning structure is provided on an outer circumferential surface of said interface element, and said second positioning structure is provided on an inner circumferential surface of said interface element, said interface element being substantially ring-shaped.

8. The joint according to claim 1, wherein each of said first element of the joint and second element of the joint includes, at one end thereof, a collar provided on which is, alternatively, said first coupling interface or said second coupling interface, each collar being configured for engagement with a clamp fastener.

9. A structure including a plurality of modular structural elements connected by means of at least one joint according to claim 1.

10. A kit of interface elements for joints according to claim 1, said kit being provided on a computer-readable mass-memory device,
wherein:
each interface element is defined as a three-dimensional mathematical model generated by means of a computer-aided-design application, and
each interface element includes a first positioning structure configured for engaging with a first coupling interface of a first element of the joint, and a second positioning structure configured for engaging with a second coupling interface of a second element of the joint, wherein said first and second positioning structures are angularly staggered with respect to one another by an angle that provides the desired relative angular position of the first element and of the second element of the joint.

11. A method for assembling a joint according to claim 1, including the steps of:
determining a desired relative angular position of said first and second elements of the joint;
producing said interface element using a 3D printer, wherein said first and second positioning structures of said interface element are angularly staggered by an angle resulting in said desired relative angular position;
coupling said first and second positioning structures with said first and second coupling interfaces, respectively; and
fastening said first and second elements of the joint.

* * * * *